(12) United States Patent
Liu et al.

(10) Patent No.: US 8,537,883 B1
(45) Date of Patent: *Sep. 17, 2013

(54) DETECTOR FOR LOW FREQUENCY OFFSET DISTORTION

(75) Inventors: Jingfeng Liu, Longmont, CO (US);
Hongwei Song, Longmont, CO (US);
Jin Xie, Longmont, CO (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/365,712

(22) Filed: Feb. 3, 2012

Related U.S. Application Data

(63) Continuation-in-part of application No. 12/025,581, filed on Feb. 4, 2008, now Pat. No. 8,111,739.

(60) Provisional application No. 60/887,835, filed on Feb. 2, 2007.

(51) Int. Cl.
*H03H 7/30* (2006.01)

(52) U.S. Cl.
USPC .................................................. 375/229

(58) Field of Classification Search
USPC ......................................... 375/229–236
See application file for complete search history.

(56) References Cited

U.S. PATENT DOCUMENTS

| | | | |
|---|---|---|---|
| 5,517,249 A | 5/1996 | Cavazos et al. | |
| 6,307,822 B1 | 10/2001 | Shim et al. | |
| 6,418,101 B1 | 7/2002 | Finkelstein | |
| 6,449,320 B1 * | 9/2002 | Lindoff | 375/319 |
| 6,507,546 B1 | 1/2003 | Bliss et al. | |
| 6,552,988 B1 | 4/2003 | Nishiwaki et al. | |
| 6,718,502 B1 | 4/2004 | Kuznetsov et al. | |
| 6,847,602 B2 | 1/2005 | Sonu | |
| 6,904,084 B2 | 6/2005 | Huang et al. | |
| 7,417,929 B2 | 8/2008 | Suryono et al. | |
| 8,111,739 B1 | 2/2012 | Liu et al. | |
| 2003/0223434 A1 | 12/2003 | Hwang et al. | |
| 2005/0157820 A1 | 7/2005 | Wongwirawat et al. | |
| 2005/0180287 A1 | 8/2005 | Lee et al. | |
| 2006/0064628 A1 | 3/2006 | Stein et al. | |
| 2006/0150065 A1 | 7/2006 | Song et al. | |
| 2006/0168493 A1 | 7/2006 | Song | |
| 2007/0053453 A1 | 3/2007 | Yeh et al. | |
| 2007/0097825 A1 | 5/2007 | Holstine | |
| 2007/0113122 A1 | 5/2007 | Ando et al. | |
| 2007/0133719 A1 | 6/2007 | Agazzi et al. | |
| 2007/0146917 A1 | 6/2007 | Song et al. | |

OTHER PUBLICATIONS

L. R. Bahl et al., "Optimal Decoding of Linear Codes for Minimizing Symbol Error Rate," IEEE Transactions on Information Theory, Mar. 1974, pp. 284-287.

(Continued)

*Primary Examiner* — Kevin Kim

(57) ABSTRACT

A system for removing low frequency offset distortion from a digital signal, the system comprising an analog-to-digital converter to convert an analog frequency signal associated with an optical storage medium to a digital frequency signal; an equalizer to equalize the digital frequency signal; an estimator to estimate a low frequency offset distortion of the digital frequency signal; a compensator to substantially cancel the low frequency offset distortion of the digital frequency signal from the equalized digital frequency signal using the estimate; and a decoder to decode the equalized digital frequency signal having the low frequency offset distortion substantially cancelled therefrom.

20 Claims, 11 Drawing Sheets

(56) References Cited

OTHER PUBLICATIONS

Jaekyun Moon et al., "Performance Comparison of Detection Methods in Magnetic Recording", IEEE Transactions on Magnetics, vol. 26, No. 6, Nov. 1990, pp. 3155-3172.
Baldur Steingrimsson et al., "Signal Space Detection for DVD Optical Recording," IEEE Transactions on Magnetics, vol. 37, No. 2, Mar. 2001, pp. 670-675.
"Non-Final Office Action", U.S. Appl. No. 12/025,581, (Apr. 28, 2011), 5 pages.
"Non-Final Office Action", U.S. Appl. No. 12/025,581, (Nov. 10, 2010), 6 pages.
"Notice of Allowance", U.S. Appl. No. 12/025,581, (Sep. 30, 2011), 5 pages.

* cited by examiner

DETECTOR FOR LOW FREQUENCY OFFSET DISTORTION

CROSS REFERENCE TO RELATED APPLICATIONS

This application is a continuation in part application of U.S. patent application Ser. No. 12/025,581, filed Feb. 4, 2008, titled "DETECTOR FOR LOW FREQUENCY OFFSET DISTORTION," of Liu et al., which claims the benefit of, and priority to, U.S. Provisional Patent Application No. 60/887,835, filed Feb. 2, 2007, titled "DETECTOR FOR LOW FREQUENCY OFFSET DISTORTION," of Liu et al., both of which are incorporated by reference herein in their entirety for all purposes.

FIELD OF THE DISCLOSURE

This invention relates generally to detecting signal distortions, and, in particular, to methods and systems for detecting, in read channels, signal distortions, such as those caused by low frequency offset.

BACKGROUND

The development of new optical recording media and data compression techniques has made it possible to achieve enormous data storage capacity using optical storage systems. Optical storage systems are typically used to store audio, video, and computer, data and such systems can include compact discs (CDs), CDROMs, DVDs, HD-DVD, Blu-Ray Disc, etc. The data can be recorded on an optical storage medium as a binary sequence by writing a series of bits representing binary 1 and 0 bits. When reading recorded data, a reading device such as a focused laser, positioned in close proximity to the optical storage medium, detects the alternations on the medium and generates an analog read signal. The analog read signal is then detected and decoded by read channel circuitry to reproduce the recorded data.

To improve the performance of a read channel in an optical storage system, sampled amplitude techniques are typically applied. Sampled amplitude read channels commonly employ an analog-to-digital converter (ADC) and a digital read channel processor to reproduce data recorded on an optical storage medium. But low frequency offset distortion, which can degrade performance, can be introduced into the digital read channel processor during this process.

DETAILED DESCRIPTION

Reference will now be made in detail to the exemplary embodiments of the invention, which are illustrated in the accompanying drawings. Wherever possible, the same reference numbers will be used throughout the drawings to refer to the same or like parts.

Figure 1:
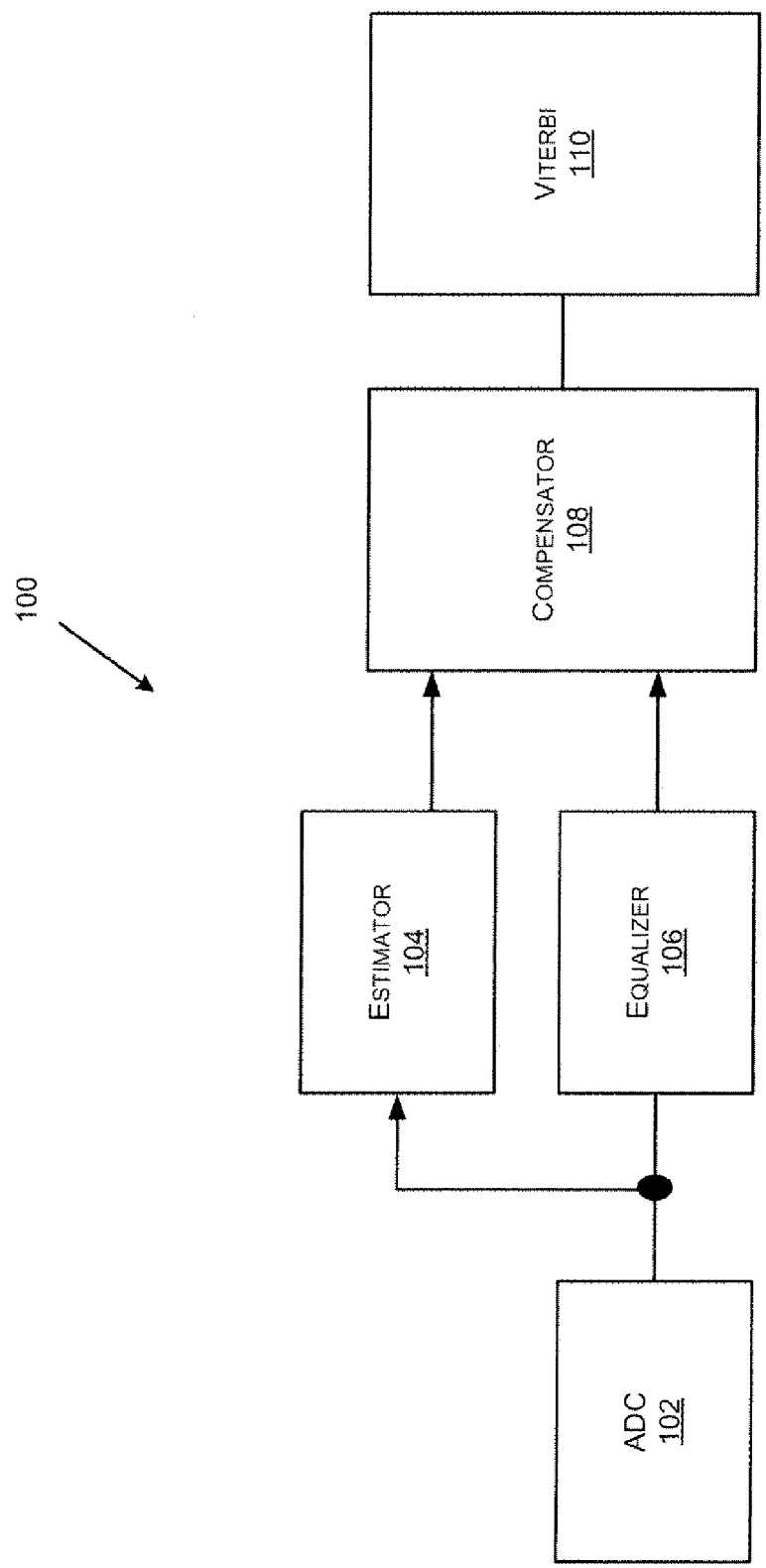
FIG. 1 illustrates a block diagram of an exemplary system consistent with the principles of the present invention.

FIG. 1 illustrates a block diagram of an exemplary system 100 consistent with one implementation of the present invention. Exemplary system 100 can be any type of system that estimates an error signal and attempts to compensate for the error signal. Exemplary system 100 can include, among other things, an analog-to-digital converter ("ADC") 102, an estimator 104, an equalizer 106, an error compensator 108, and a viterbi decoder 110.

In one implementation, ADC 102 is a component that receives an analog radio frequency signal associated with a signal such as, for example, a signal generated by a reading device reading an optical storage medium, such as a high definition DVD (HD DVD). ADC 102 samples the analog signal and converts the samples into a digital signal a(k), which includes digital values. The digital values are then digitally processed to recover stored data. In one implementation, the digital signal a(k) is provided to both estimator 104 and equalizer 106.

In one implementation, estimator 104 is a component that receives digital signal a(k) from ADC 102 and provides low frequency offset distortion e(k) to error compensator 108. An exemplary estimator 104 is further illustrated in FIG. 2 and described below. The estimated low frequency offset distortion can be used to reconstruct a distortion-free signal.

In one implementation, equalizer 106 is a component that receives digital signal a(k) from ADC 102 and provides equalized data to error compensator IN. Equalizer 106 can boost high frequency components to compensate for the optical frequency response of the reading device, e.g., an optical disk reader. Many methods of digital filtering are known that may be suitable for this purpose. For example, equalizer 106 could be a finite impulse response (FIR) filter, which can be expressed by the following equation:

$$b(k) = \sum_{i=0}^{N} F_i a(k-i).$$

where a(k) is the input signal, b(k) is the output signal, $F_i$ is the filter coefficient, and N is the filter order. An Nth-order filter has (N+1) terms on the right side, which are commonly referred to as taps. While any number of taps could be used for equalizer 106, for this exemplary embodiment, a 3-tap FIR will be used providing the following expression for b(k):

$b(k)=F_0 a(k)+F_1 a(k-1)+F_2 a(k-2).$

In one implementation, error compensator 108 is a component that receives estimated low frequency offset distortion, e(k), from estimator 104 and equalized data, b(k), from equalizer 106 and reconstructs a distortion-free signal. For example, an exemplary embodiment of error compensator 108 is further illustrated in FIG. 2 described below. Many methods of compensating are known that may be suitable for this purpose. After compensating the distortion, error compensator 108 provides the compensated signal to viterbi decoder 110. In one implementation, viterbi decoder 110 decodes the compensated data output from error compensator 108. In one implementation, the compensated data comprises an equalized digital frequency signal having low frequency offset distortion substantially cancelled therefrom.

Figure 2:
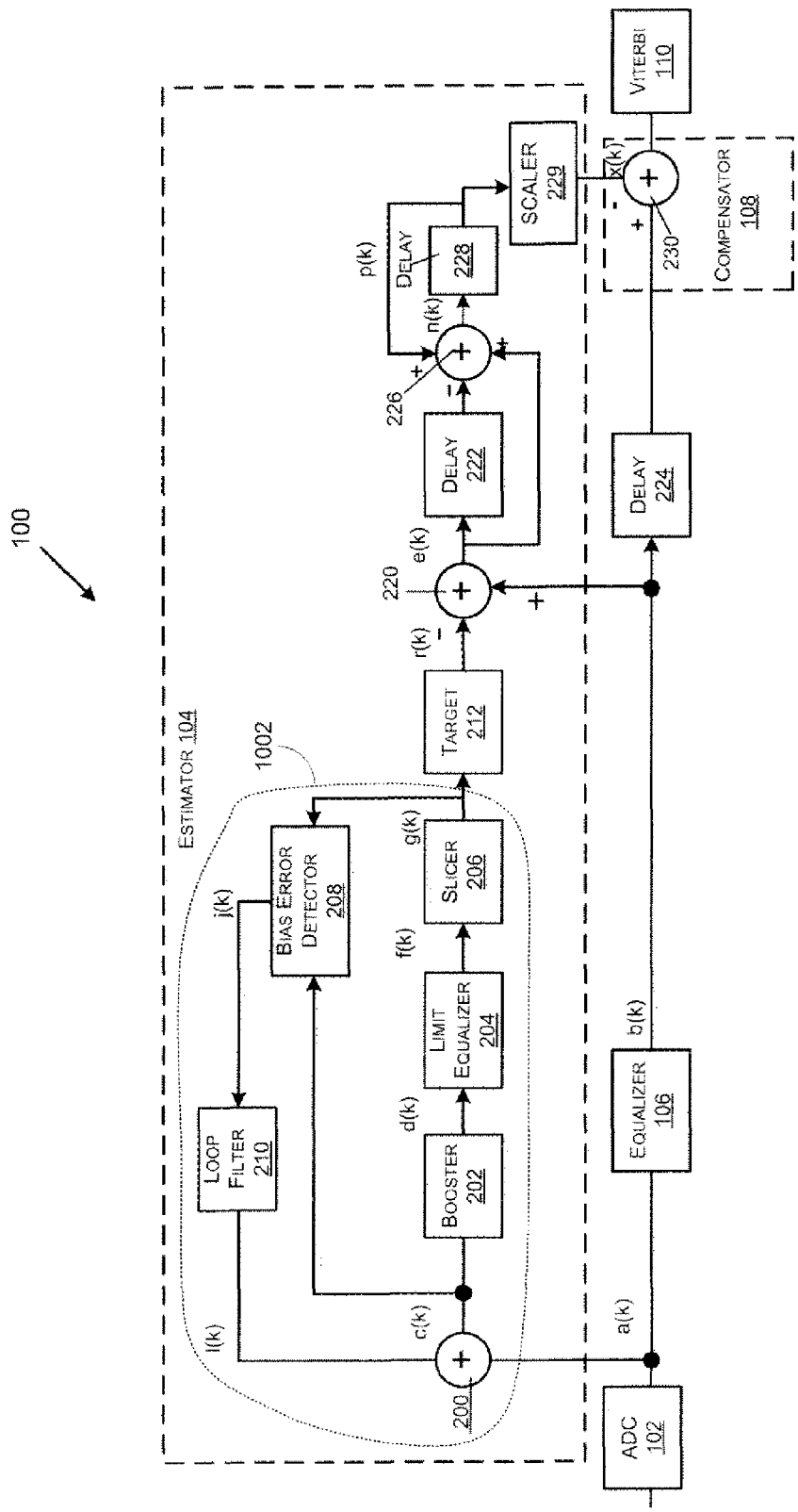
FIG. 2 illustrates exemplary circuit designs for an estimator and an error compensator provided within the exemplary system of FIG. 1.

FIG. 2 illustrates a block diagram of exemplary system 100 provided in FIG. 1. This block diagram provides exemplary circuit designs for estimator 104 and compensator 108.

Figure 3:
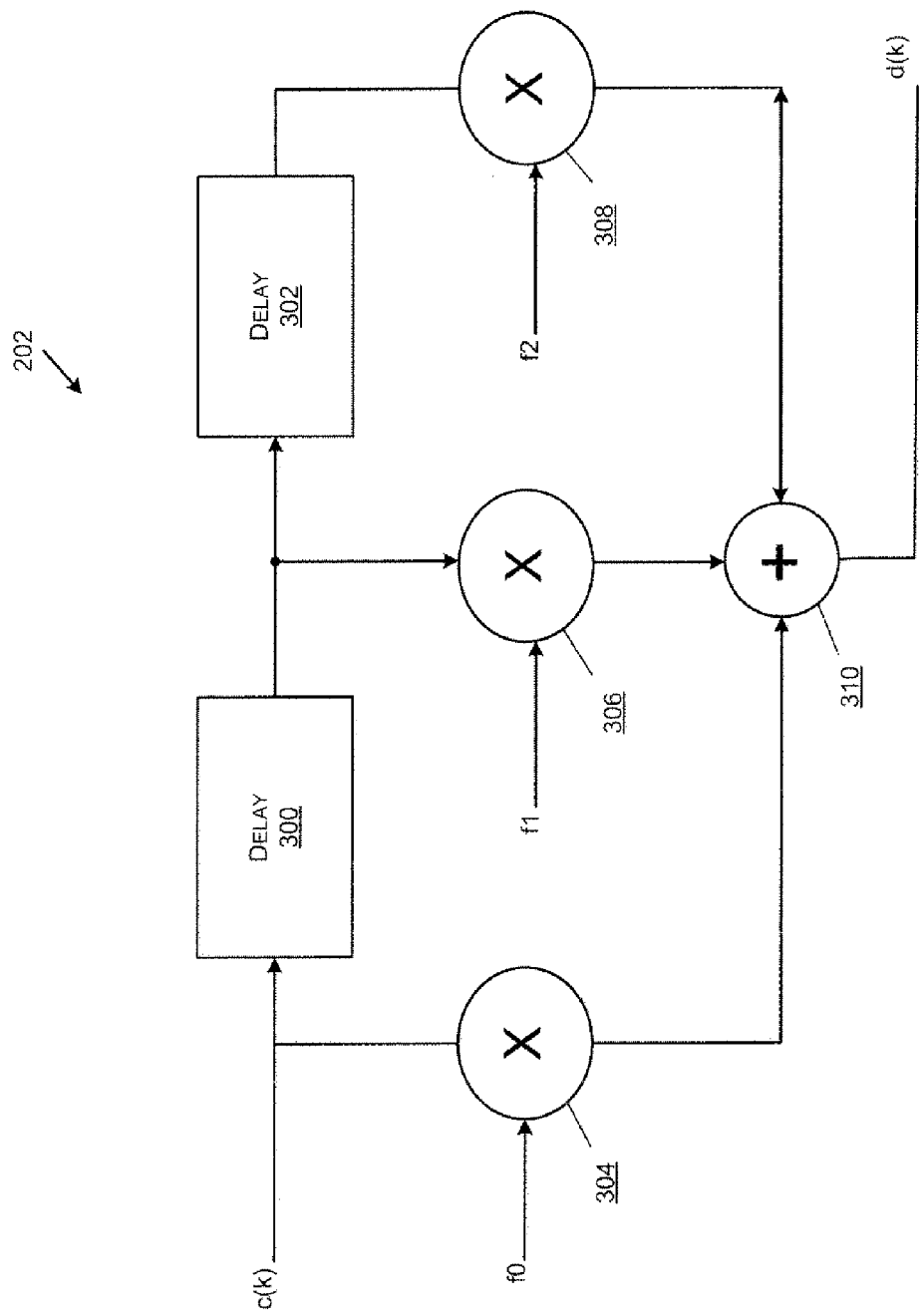
FIG. 3 illustrates an exemplary embodiment of a digital booster provided within the exemplary system of FIG. 2.

In one implementation, estimator 104 is a component that receives digital signal a(k) from ADC 102 and provides estimated low frequency offset distortion, e(k), to error compensator 108. To begin, the digital signal a(k) is provided to a detector 1002 which, in the embodiment shown in FIG. 2, comprises an adder 200, which combines digital signal a(k) with an output signal I(k) from a loop filter 210 to generate a combined signal c(k). Combined signal c(k) is provided to a booster 202, which amplifies the high frequency components of combined signal c(k). For example, booster 202 can be represented by the digital 3-tap booster illustrated in FIG. 3. The number of taps in the booster corresponds to the number of taps provided by equalizer 106 (which is a 3-tap FIR illustrated in the exemplary embodiment shown). For this exemplary embodiment of booster 202, combined signal c(k) is provided to a first delay 300 generating c(k−1), and to a second delay 302 generating c(k−2). Combined signal c(k) is mixed with carrier frequency f0, c(k−1) with f1, and c(k−2) with f2. The mixed signals are combined by an adder 310, which outputs the following boosted signal d(k):

$$d(k)=c(k)e^{j2\pi f0 t}+c(k-1)e^{j2\pi f1 t}+c(k-2)e^{j2\pi f2 t};$$

where d(k) is the output of booster 202, and f0, f1, and f2 are carrier frequencies provided by, e.g., a program to boost the high frequency components of combined signal c(k). These carrier frequencies can be predetermined beforehand or can be adjusted based on a desired output for d(k).

Figure 4:
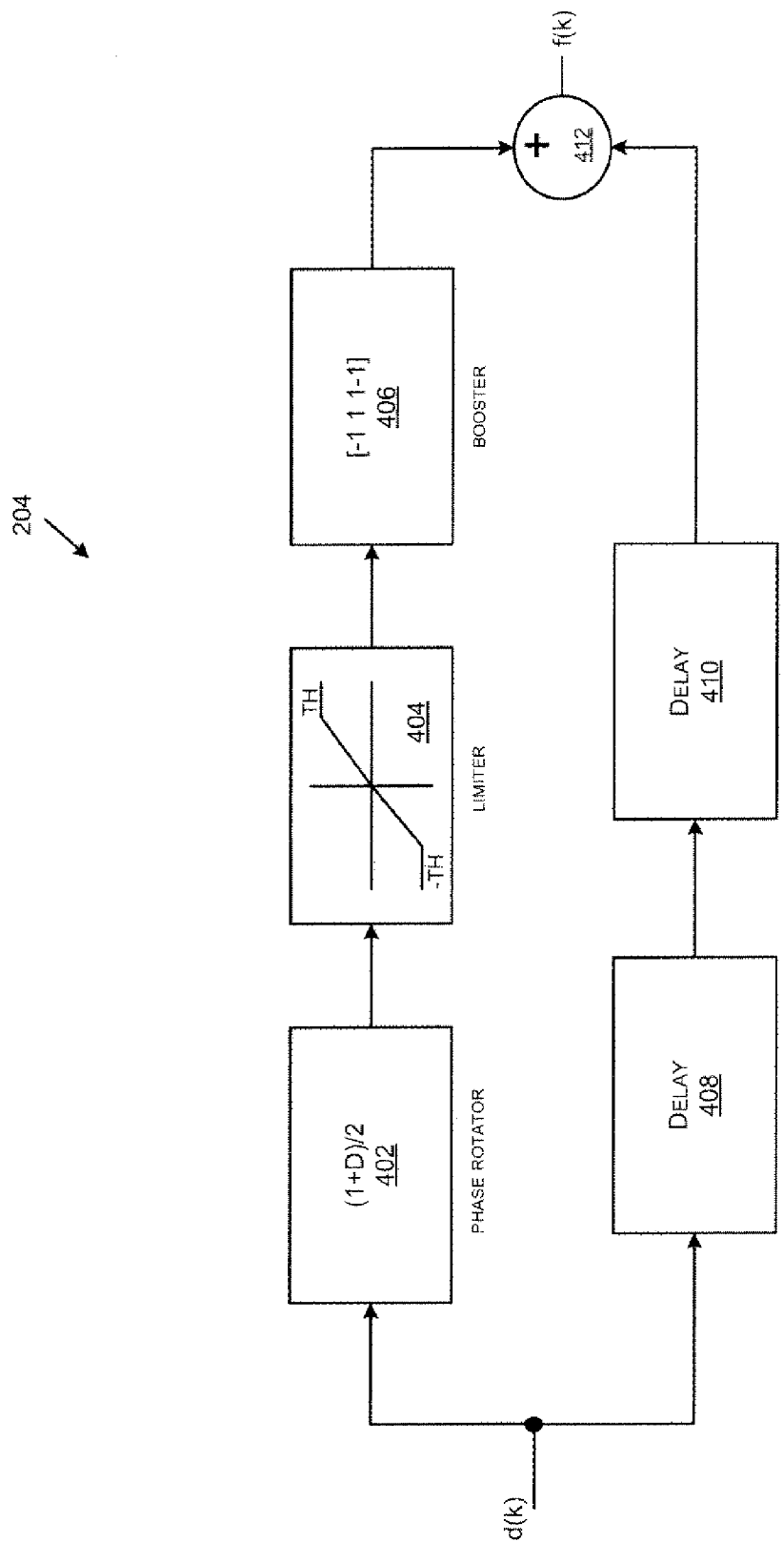
FIG. 4 illustrates an exemplary embodiment of a limit equalizer provided within the exemplary system of FIG. 2.

A limit equalizer 204 can receive boosted signal d(k) from booster 202. In one implementation, limit equalizer 204 amplifies boosted signal d(k) in a non-linear fashion and provides a signal f(k) to a slicer 206. An exemplary embodiment of limit equalizer 204 is illustrated in FIG. 4. In FIG. 4, signal d(k) is provided to a phase rotator 402. In one implementation, phase rotator 402 adds a current sample d(k) and a previous sample d(k−1) and divides by two. In some embodiments, this procedure pushes the phase back by 90°. A threshold limiter 404 receives the output of phase rotator 402 and discards any part of the signal that extends outside of a predetermined threshold set. The output of threshold limiter 404 is provided to booster 406. Booster 406 is similar to booster 202 of FIGS. 2-3, except that (in one implementation) booster 406 is a 4-tap booster that includes a [−1 1 1 −1] as input. The output of booster 406 is provided to an adder 412. Adder 412 adds the output of booster 406 and a double delayed signal d(k−2) to produce signal f(k). In one implementation, a combined delay of delays 408, 410 substantially matches the delay of the upper segment of the exemplary limit equalizer 204 provided in FIG. 4.

Slicer 206 receives signal f(k) from limit equalizer 204. The objective of slicer 206 can be to provide preliminary decisions for loops in the read channel for the incoming signal f(k). In this exemplary embodiment, slicer 206 acts as a decision device for the timing loop, the FIR adaptation loops, etc. Slicer 206 provides a signal g(k) to both a bias error detector 208 (as a feedback signal) and to a target 212 (as an output signal of the detector 1002). If f(k) is greater than 0, then the signal g(k)=1, else g(k)=−1.

Figure 5:
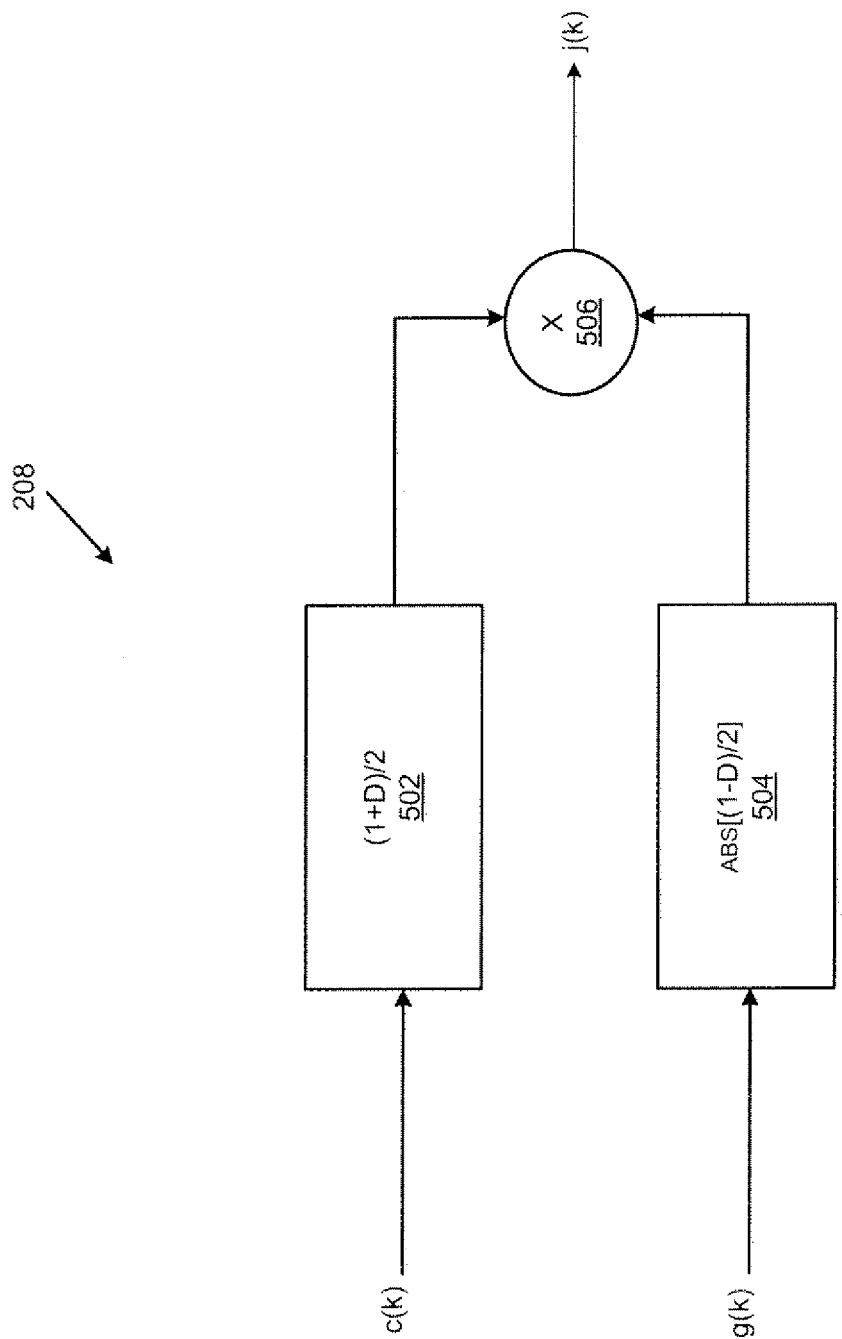
FIG. 5 illustrates an exemplary embodiment of a bias error detector provided within the exemplary system of FIG. 2.

Bias error detector 208 receives signal g(k) from slicer 206 and signal c(k) from adder 200 to generate a bias error signal j(k). Bias error detector 208 provides the error signal for the slicer bias loop that removes DC and low frequency offset distortion from a path of slicer 206. An exemplary low frequency offset distortion will be 40% of peak-to-peak b(k). An exemplary embodiment of bias error detector 208 is illustrated in FIG. 5. Exemplary bias error detector 208 includes a configuration that provides signal c(k) to a phase rotator 502. In one implementation, phase rotator 502 adds a current sample c(k) and a previous sample c(k−1) and divides by two. This phase rotated signal is provided to a mixer 506. In the lower segment of bias error detector 208, slicer output signal g(k) is provided to phase rotator 504. In one implementation, phase rotator 504 takes the absolute value of (g(k)−g(k−1))/2. The phase rotated signal from the lower segment is mixed with the phase rotated signal of the upper segment by mixer 306. Mixer 306 provides a bias error signal j(k) to loop filter 210.

Figure 6A:
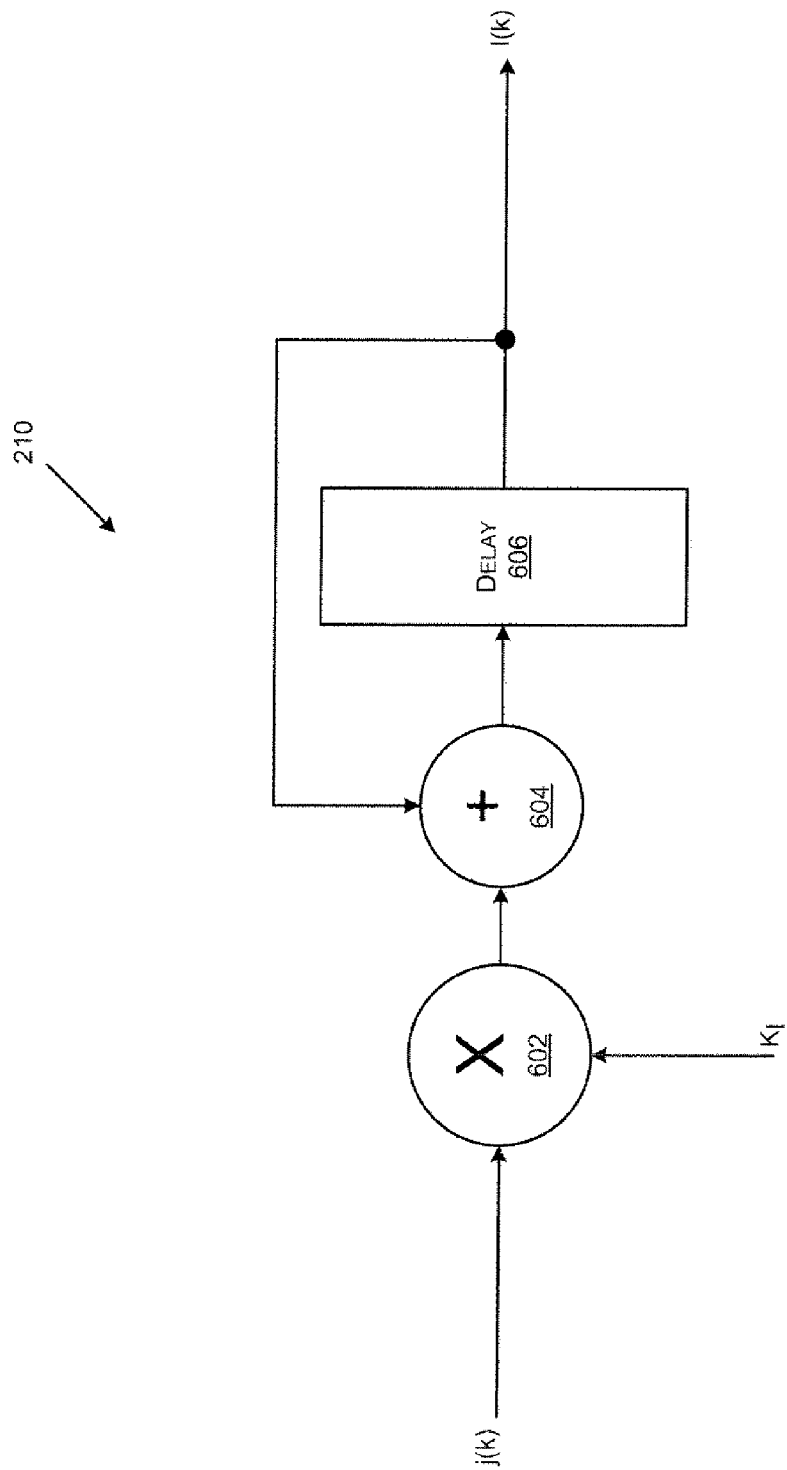
FIGS. 6A-B illustrate exemplary loop filters that can be provided within the exemplary system of FIG. 2.

Loop filter 210 can be any appropriate filter. In some embodiments, loop filter 210 can be an integrating filter, as illustrated in FIG. 6A. As shown in FIG. 6A, in an exemplary embodiment, bias error signal j(k) is provided to a mixer 602, which mixes bias error signal j(k) with an integrating loop gain, $K_I$. The mixed signal is then provided to an accumulator comprising a control loop enclosing an adder 604 and a delay 606. The accumulator provides loop filter output I(k), which is provided to adder 200 of FIG. 2. Output I(k) is subtracted at adder 200 to remove low frequency offset distortion from the slicer path.

Figure 6B:
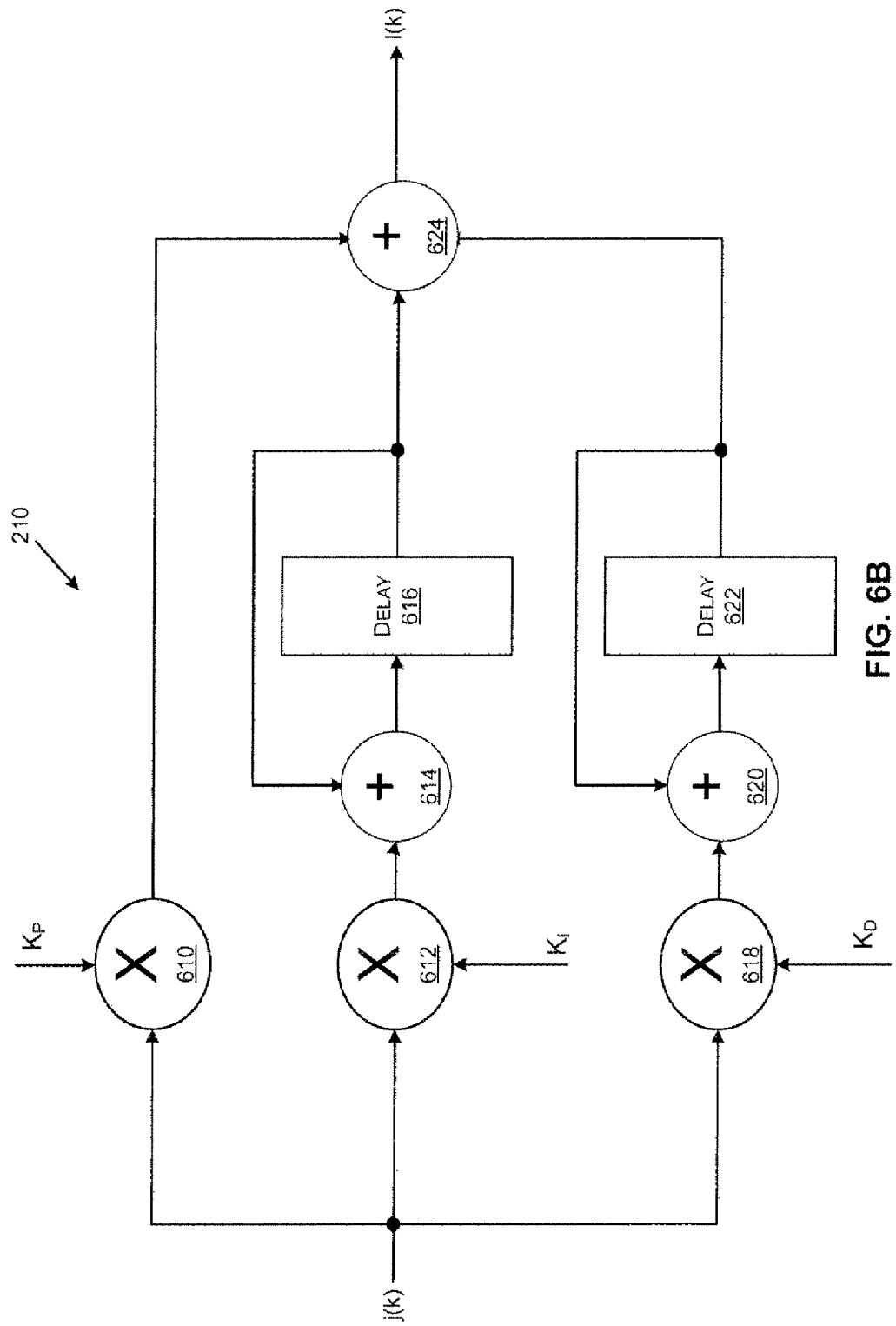

In some embodiments, loop filter 210 can be a ND (proportional-integral-differential) filter, as illustrated in FIG. 6B. In this case, the PID filter attempts to correct the error between a bias error signal j(k) and a desired setpoint. The PID filter includes three separate parameters: the proportional, the integral, and the derivative values. The proportional value determines the reaction to the bias error signal j(k). To determine the proportional value, the bias error signal j(k) is mixed with a gain proportion Kp by a mixer 610. Mixer 610 outputs to an adder 624 the proportional value used to determine the reaction. The following equation can be used to calculate the proportional value: where Pout is the proportional value and Kp is the proportional gain.

The integral value of the PIO filter determines the reaction based on the sum of recent bias error signals. To determine the integral value, the bias error signal j(k) is mixed with a gain integral, K1, at a mixer 612. Mixer 612 outputs the mixed signal to an accumulator. The accumulator includes a control loop enclosing an adder 614 and a delay 616, and provides an integral value signal to adder 624. The following equation can be used to calculate the integral value:

$$P_{out}=K_p j(k);$$

where $P_{out}$ is the integral value and $K_p$ is the integral gain. The integral value, when added to the proportional term, accelerates the movement of the process towards a setpoint.

The derivative value determines the reaction to the rate at which the bias error signal j(k) has been changing. To determine the derivative value, the bias error signal j(k) is mixed with a gain differential, $K_D$, at a mixer 618. Mixer 618 outputs the mixed signal to an accumulator. The accumulator includes a control loop enclosing adder 620 and delay 622, and provides a derivative value signal to adder 624. The following equation can be used to calculate the derivative value:

$$D_{out} = K_D \frac{dj}{dk};$$

where $D_{out}$ is the derivative value and $K_D$ is the derivative gain. The derivative value slows the rate of change to reduce any overshoot produced by the integral value. Adder 624 adds the proportional value $K_P$, the integral value $K_I$, and the derivative value $K_D$ to provide I(k). Loop filter output I(k) can be calculated using the following equation:

$$I(k) = K_P j(k) + K_I \int_0^k j(\tau) d\tau + K_D \frac{dj}{dk}.$$

Referring back to FIG. 2, signal I(k) is provided to adder 200 to remove distortion from the slicer path.

As stated above, slicer 206 also provides signal g(k) to target 212. In some embodiments, target 212 can be a partial response target filter that outputs a reconstructed signal, r(k). Target 212 can be implemented, for example, using fixed integer coefficients or adaptable real coefficients.

At adder 220, the reconstructed signal, r(k), is subtracted from signal, b(k), to obtain the low frequency offset distortion, e(k), as set forth in the following equation:

e(k)=b(k)−r(k).

Signal e(k) is provided to a delay 222 that provides an output e(k−1) to an adder 226. Adder 226 also receives a signal p(k) from an accumulator of an enclosed control loop including adder 226 and a delay 228. The output signal n(k) of adder 226 is given by the following equation:

n(k)=e(k)−1)+p(k);

where p(k)=n(k−1).

Delay 226 outputs estimated disturbance signal p(k). While estimated disturbance signal p(k) is determined by the sliding window average above, any suitable component or components can be used to provide a sliding window average; for example, such a component may be a 32-tap FIR where each carrier input is 1. Estimated disturbance signal p(k) is provided to a scaler 229, and the output is then combined with b(k−1), the output of delay 224, at adder 230. Adder 230 outputs signal x(k) to viterbi decoder 110, wherein x(k) is given by the following equation:

x(k)=b(k−1)−p(k).

Figure 7:
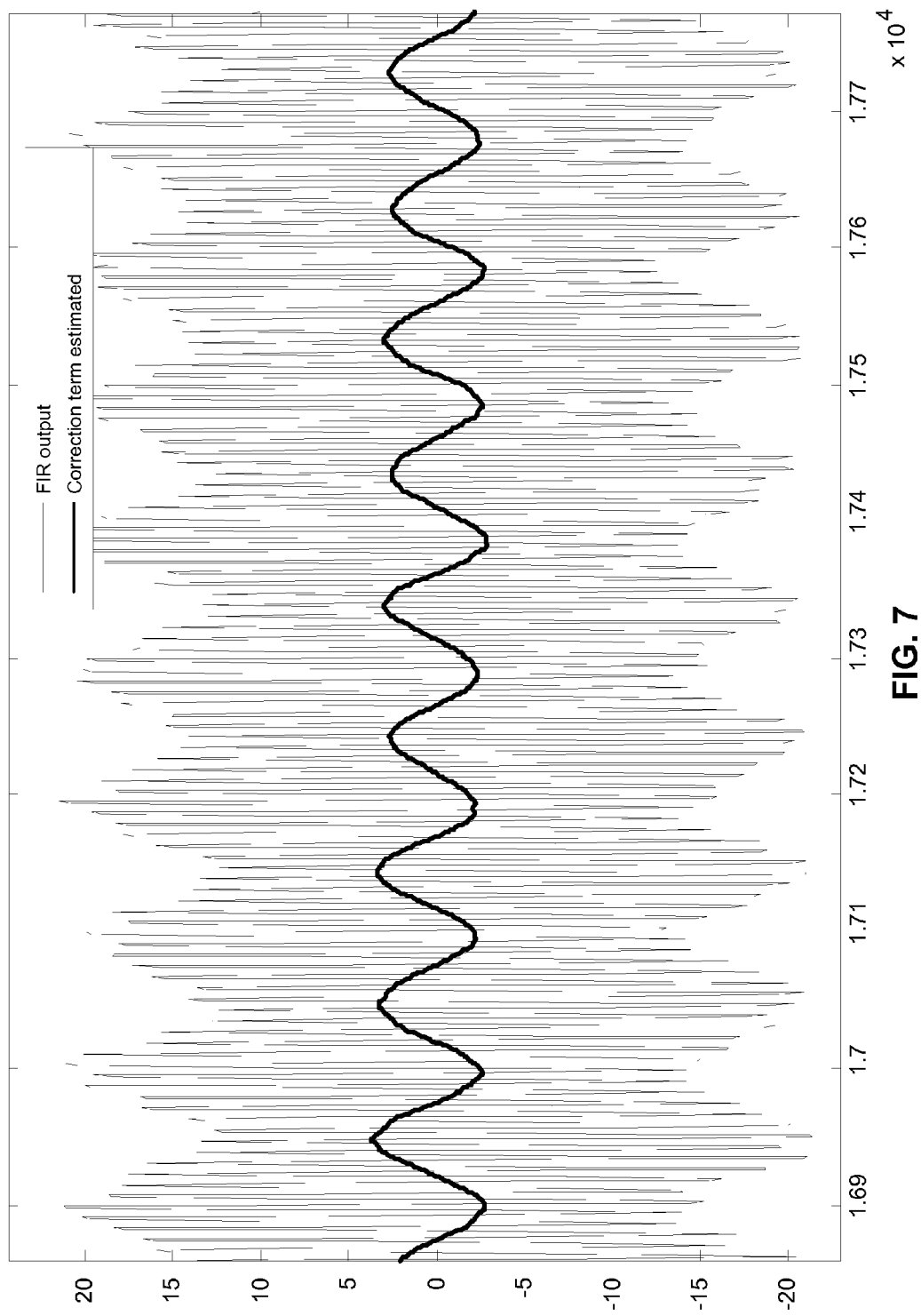
FIG. 7 provides a chart illustrating a disturbance estimated by the exemplary system of FIG. 1.
Figure 8:
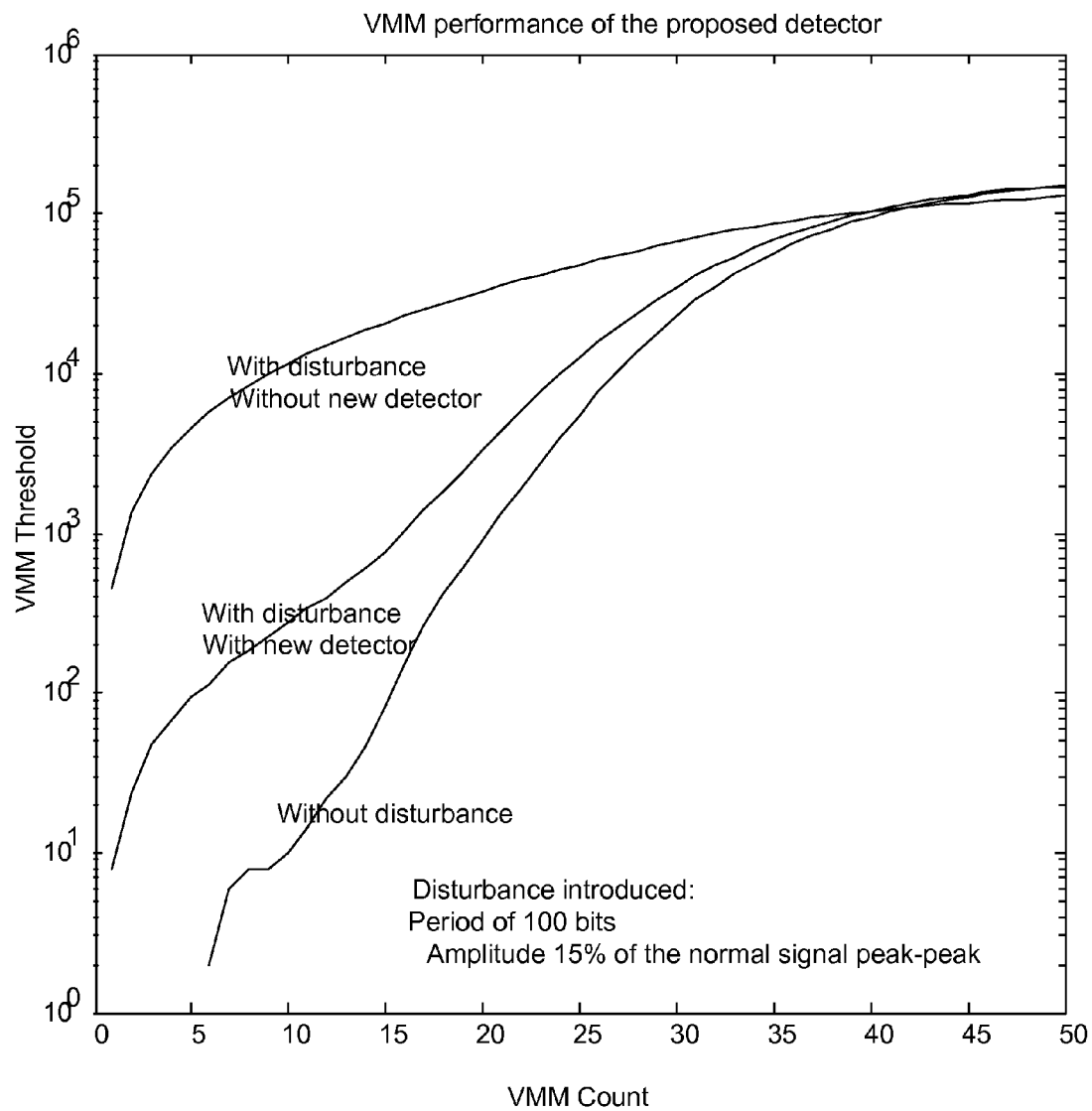
FIG. 8 provides a chart illustrating a performance, in terms of Viterbi metric margin, of the exemplary system of FIG. 1.
Figure 9:
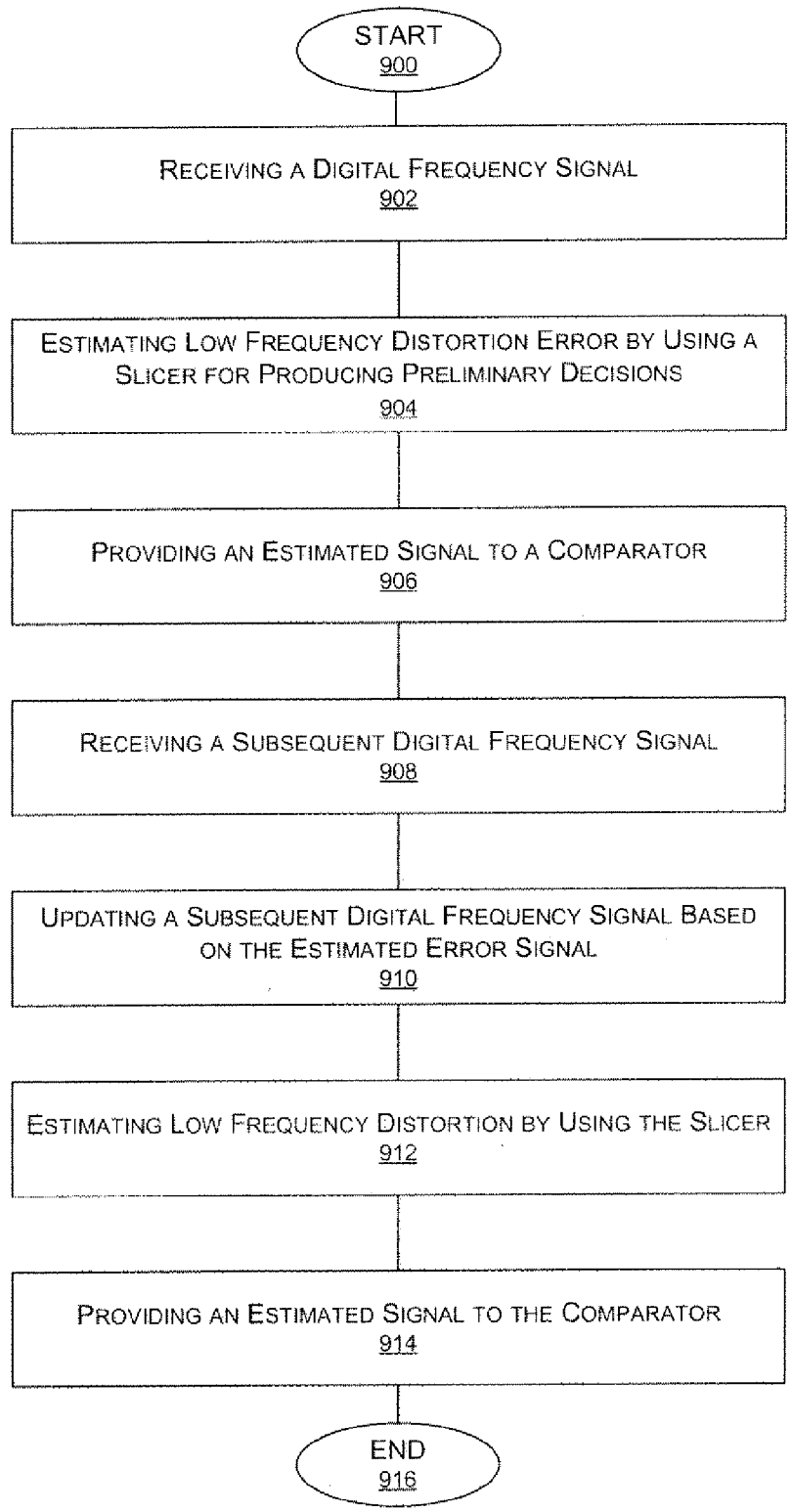
FIG. 9 is a high-level flow diagram according to one embodiment of the present invention.

When implementing an embodiment the same as or similar to the embodiment described above, a controlled low frequency disturbance was introduced to a captured waveform of an HD DVD. The low frequency disturbance was a sinusoidal with a period of 100 channel bits and an amplitude of 15% of the signal peak-to-peak. FIG. 7 provides a chart illustrating the disturbance estimated by the exemplary system of FIG. 2. FIG. 8 provides a chart illustrating the performance, in terms of Viterbi metric margin, of the exemplary system of FIG. 2.

Figure 10:
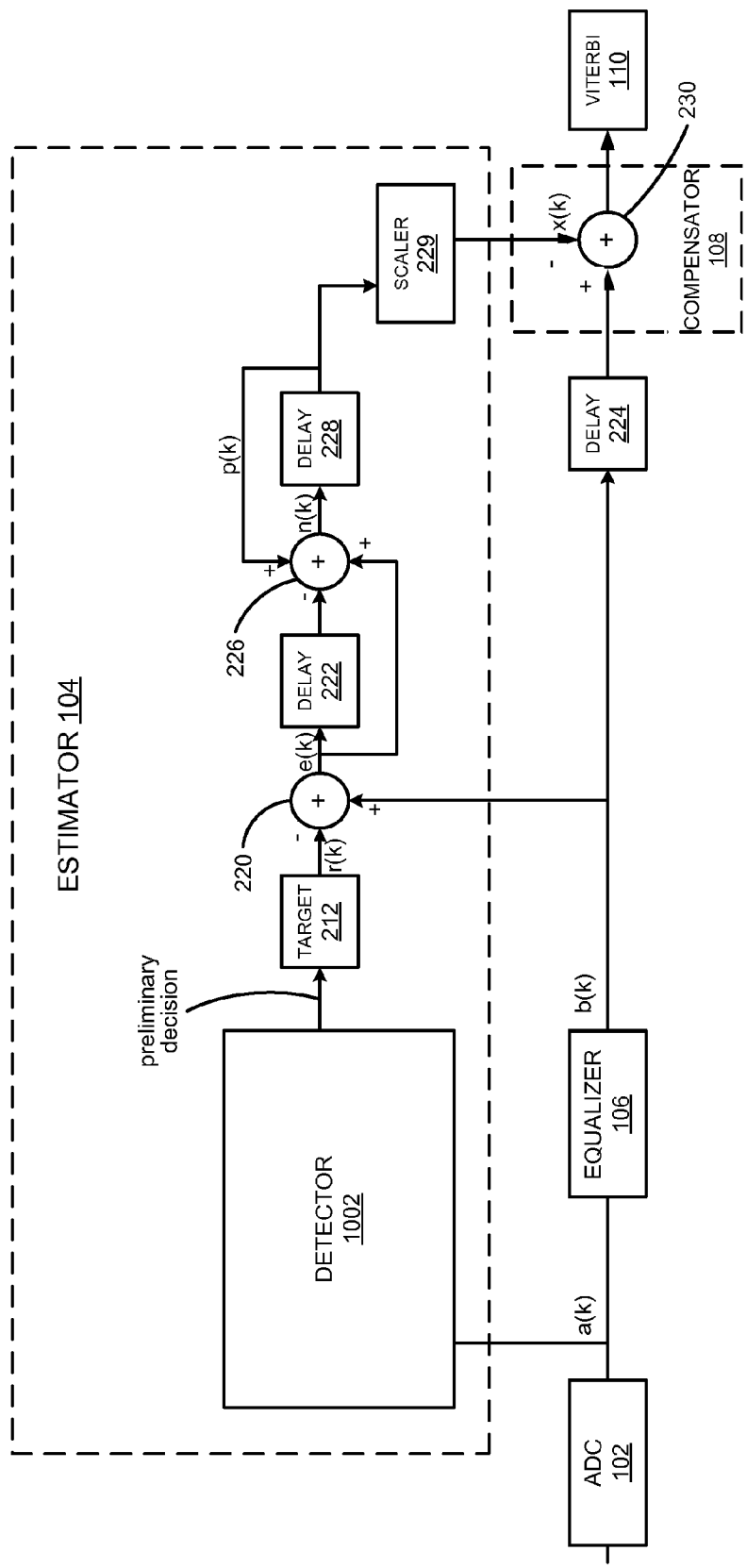
FIG. 10 illustrates a more generalized circuit design of FIG. 2.

FIG. 10 illustrates a more generalized embodiment of the present disclosure shown in FIG. 2 where the detector 1002 can be any of numerous known designs. The detector 1002 shown in FIG. 2 comprises a slicer 206 and supporting circuits. In accordance with the present disclosure, the detector 1002 shown in FIG. 10 may include any of well known designs. In embodiments, the detector 1002 in FIG. 10 receives the digital signal a(k) from ADC 102 and generates a preliminary decision which feeds into the target 212, which is then processed as explained above.

In a particular embodiment, the detector 1002 may be a Viterbi detector, which is a commonly used detector in data storage systems including optical data storage systems. In another embodiment, the detector 1002 may employ a fixed delay tree search algorithm with decision feedback (FDT/DF). See for example, Jaekyun Moon and L. Richard Carley, "Performance Comparison of Detection Methods in Magnetic Recording," IEEE Transaction on Magnetics., Vol. 26, No. 6, pp. 3155-3172, November 1990, which is incorporated herein in its entirety for all purposes. In still another embodiment, the detector 1002 may comprise a signal space detector. See for example, Baldur Steingrimsson, Jaekyun Moon, and Travis Oenning, "Signal Space Detection for DVD Optical Recording," IEEE Transaction on Magnetics., Vol. 37, No. 2, pp. 670-675, March 2001, which is incorporated herein in its entirety for all purposes. In yet another embodiment, the detector 1002 may be based on the Bahl-Cocke-Jelinek-Raviv (BCJR) algorithm to implement a BCJR detector. See for example, L. R. Bahl, J. Cocke, F. Jelinek, and J. Raviv, "Optimal Decoding of Linear Codes for Minimizing Symbol Error Rate," IEEE Transactions on Information Theory., pp. 284-287, March 1974, which is incorporated herein in its entirety for all purposes. It will be appreciated, of course, that still other known detection circuits may be used for detector 1002.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A system comprising:
    an analog-to-digital converter configured to receive an analog frequency signal and to produce a digital frequency signal;
    an equalizer configured to receive the digital frequency signal and to produce an equalized signal;
    an estimator configured to receive the digital frequency signal and to produce an estimate of a low frequency offset distortion of the digital frequency signal, the estimator comprising a detector configured to receive the digital frequency signal and to produce preliminary decisions from which the estimate is produced;

a compensator configured to receive the equalized signal and to substantially cancel the low frequency offset distortion of the digital frequency signal from the equalized signal using the estimate; and a decoder to decode an output of the compensator.

2. The system of claim 1, wherein the detector is a Viterbi detector.

3. The system of claim 1, wherein the detector is based a fixed delay tree search algorithm with decision feedback.

4. The system of claim 1, wherein the detector is a signal space detector.

5. The system of claim 1, wherein the detector is based on the Bahl-Cocke-Jelinek-Raviv (BCJR) algorithm.

6. The system of claim 1, wherein the digital frequency signal is received from an optical storage medium and the detector: i) comprises a Viterbi detector; ii) comprises a signal space detector; iii) is based on a fixed delay tree search algorithm with decision feedback; or iv) is based on a Bahl-Cocke-Jelinek-Raviv (BCJR) algorithm.

7. The system of claim 6, wherein the optical storage medium comprises one of a compact disc (CD) or a digital versatile disc (DVD).

8. A system for estimating an error signal of a digital frequency signal associated with an optical storage unit, the estimator comprising:

an analog-to-digital converter configured to receive an analog frequency signal associated with an optical storage medium and to produce a digital frequency signal;

an equalizer configured to receive the digital frequency signal and to produce an equalized signal;

an estimator configured to receive the digital frequency signal and to produce an estimate of a low frequency offset distortion of the digital frequency signal, the estimator comprising a detector configured to receive the digital frequency signal and to produce preliminary decisions from which the estimate is produced, the detector either: comprising a Viterbi or a signal space detector; or based on a fixed delay tree search algorithm with decision feedback or a Bahl-Cocke-Jelinek-Raviv (BCJR) algorithm;

a compensator configured to receive the equalized signal and to substantially cancel the low frequency offset distortion of the digital frequency signal from the equalized signal using the estimate; and a decoder to decode an output of the compensator.

9. The system of claim 8, wherein the detector comprises the Viterbi detector.

10. The system of claim 8, wherein the detector is based on the fixed delay tree search algorithm with decision feedback.

11. The system of claim 8, wherein the detector comprises the signal space detector.

12. The system of claim 8, wherein the detector is based on the BCJR algorithm.

13. The system of claim 8, wherein the optical storage medium comprises one of a compact disc (CD) or a digital versatile disc (DVD).

14. A method for removing distortion from a digital frequency signal, the method comprising:

receiving an analog frequency signal;

converting the analog frequency signal to produce a digital frequency signal;

equalizing the digital frequency signal to produce an equalized signal;

producing a preliminary decision based on the digital frequency signal;

producing an estimation of a low frequency offset distortion of the digital frequency signal based at least on the preliminary decision;

substantially removing the low frequency offset distortion of the digital frequency signal from the equalized signal using the estimation to produce a processed digital frequency signal; and decoding the processed digital frequency signal.

15. The method of claim 14, wherein producing the preliminary decision uses a Viterbi detector.

16. The method of claim 14, wherein producing the preliminary decision uses a fixed delay tree search algorithm with decision feedback.

17. The method of claim 14, wherein producing the preliminary decision uses a signal space detector.

18. The method of claim 14, wherein producing the preliminary decision uses a Bahl-Cocke-Jelinek-Raviv (BCJR) algorithm.

19. The method of claim 14, wherein the analog frequency signal is an output signal of an optical storage medium, and wherein producing the preliminary decision comprises using: a Viterbi detector; a fixed delay tree search algorithm with decision feedback; a signal space detector; or a Bahl-Cocke-Jelinek-Raviv (BCJR) algorithm.

20. The method of claim 19, wherein the optical storage medium comprises one of a compact disc (CD) or a digital versatile disc (DVD).

* * * * *